United States Patent
Radermacher

(10) Patent No.: US 8,680,779 B2
(45) Date of Patent: Mar. 25, 2014

(54) POWER INTERFACE WITH LEDS FOR A TRIAC DIMMER

(75) Inventor: Harald Josef Gunther Radermacher, Aachen (DE)

(73) Assignee: Koninklijke Philips N.V., Eindhoven (NL)

(*) Notice: Subject to any disclaimer, the term of this patent is extended or adjusted under 35 U.S.C. 154(b) by 157 days.

(21) Appl. No.: 13/379,044

(22) PCT Filed: Jun. 15, 2010

(86) PCT No.: PCT/IB2010/052665
§ 371 (c)(1),
(2), (4) Date: Dec. 19, 2011

(87) PCT Pub. No.: WO2010/146529
PCT Pub. Date: Dec. 23, 2010

(65) Prior Publication Data
US 2012/0098457 A1    Apr. 26, 2012

(30) Foreign Application Priority Data

Jun. 18, 2009 (EP) .................. 09163075

(51) Int. Cl.
*H05B 37/02* (2006.01)
*G05F 3/02* (2006.01)

(52) U.S. Cl.
USPC ............................... 315/291

(58) Field of Classification Search
None
See application file for complete search history.

(56) References Cited

U.S. PATENT DOCUMENTS

| | | | |
|---|---|---|---|
| 5,424,618 A * | 6/1995 | Bertenshaw et al. | 315/324 |
| 7,075,251 B2 | 7/2006 | Chen et al. | |
| 7,091,676 B2 * | 8/2006 | Rodriguez et al. | 315/307 |
| 2004/0100205 A1 | 5/2004 | Takahashi et al. | |
| 2005/0258765 A1 * | 11/2005 | Rodriguez et al. | 315/86 |
| 2006/0244392 A1 * | 11/2006 | Taipale et al. | 315/200 R |
| 2007/0182347 A1 * | 8/2007 | Shteynberg et al. | 315/312 |
| 2008/0258647 A1 | 10/2008 | Scianna | |
| 2008/0315779 A1 * | 12/2008 | Taipale et al. | 315/209 R |
| 2009/0108770 A1 * | 4/2009 | Terashima et al. | 315/291 |
| 2009/0122580 A1 | 5/2009 | Stamm et al. | |

FOREIGN PATENT DOCUMENTS

WO    2005/115058 A1    12/2005

* cited by examiner

*Primary Examiner* — Crystal L Hammond
(74) *Attorney, Agent, or Firm* — John Salazar; Mark Beloborodov

(57) ABSTRACT

A power interface is proposed, which keeps an adjustable power supply circuit in a conducting state even if the average current consumption of an attached load is below the adjustable power supply circuit's holding current requirement. The power interface makes use of the dynamic properties of adjustable power supply circuits. Due to the recovery time of the adjustable power supply circuit, it will stay in the conducting state even if there is no current flowing for a short while. The power interface makes use of this effect by interrupting and re-establishing a current flow from the adjustable power supply circuit.

19 Claims, 5 Drawing Sheets

POWER INTERFACE WITH LEDS FOR A TRIAC DIMMER

FIELD OF THE INVENTION

The present invention relates to a power interface. Particularly it relates to a power interface for connecting a load to an adjustable power supply circuit having a time-dependent holding current level or other restrictions on the load current.

BACKGROUND OF THE INVENTION

For a high market penetration of solid state light sources, such as Light Emitting Diode (LED) light sources, at the time being, retrofit lamps are considered quite important. For most consumer luminaires the user/customer may be able to replace only the sole light source (e.g. the incandescent light bulb) inside a luminaire with a modern LED light source at low initial cost. Not only the compatibility with the socket but also the compatibility with the existing installation/circuitry is quite important. Therefore, the light source should fit into existing sockets and should be compatible with the existing electrical installation, including dimmers. This includes interoperability with existing wall dimmers.

Especially Triode for Alternating Current (TRIAC)-based leading edge dimmers are used in many households. With these dimmers, there is quite often the problem that the load of the LED light source is too small to work properly with the dimmer. As a result the LED light source may start to flicker or even permanently switch off when the dimming level becomes too low. That is, in case wall dimmers are present, the low power consumption of the solid state light source may cause problems with the latching and holding current of the TRIAC. Especially with low wattage lamps with a power consumption below 40 W (e.g. a 2 W candle light bulb for a E14 screw socket), the minimum load of the TRIAC dimmer circuit is not reached. Hence, the luminaire will not work at all or might work in a chaotic mode of flashes.

There have been proposals to use a special switch mode power supply to shape the current consumption of the lamp according to the required holding current of the TRIAC. Taking the typical 50 mA of a standard TRIAC, the minimum load would be more then 10 W in a 230V-system. But, for the intended power range of the retrofit lamps, this might still be too much power.

U.S. Pat. No. 7,075,251 discloses a ballast having a resonant feedback circuit drawing continuous input current from a wide range of source voltages to satisfy requirements of phase control dimmers by using a keep-alive functionality. During the time when the input voltage is lower than a bus capacitor voltage, there would be no input current, resulting in the TRIAC going to the off state. To prevent this, a high frequency current is continuously consumed. As a result the TRIAC is kept in the on state, but the load still has to draw the TRIAC holding current.

SUMMARY OF THE INVENTION

It is an object of the present invention to overcome this problem, and to provide a power interface which keeps an adjustable power supply circuit in a conducting state even if the average current consumption of an attached load is below the adjustable power supply circuit's holding current requirement.

Generally, the above objectives are achieved by a power interface according to the attached independent claim.

According to a first aspect, the above objects are achieved by a power interface for connecting a load to an adjustable power supply circuit having a time-dependent holding current level, comprising: a current shaper arranged to be operatively connected between the load and the adjustable power supply circuit, wherein the current shaper is configured to interrupt and re-establish a current flow from the adjustable power supply circuit, ensuring that the current through the adjustable power supply circuit periodically is above the holding current level, thereby keeping the adjustable power supply circuit in a conducting state even when the average current consumption of the load is lower than the holding current level.

The holding current is by definition the minimum current which must pass through the adjustable power supply circuit in order for it to remain in a conducting state. In other words, once triggered, the adjustable power supply circuit continues to conduct until the current through it drops below the holding current. However, due to the recovery time of the adjustable power supply circuit, it will in fact stay in the conducting state even if there is no current flowing for a short period of time. As will be further disclosed below, this period of time depends inter alia on the supplied current and the components of the adjustable power supply circuit. The holding current level may be determined by a circuit topology of the adjustable power supply circuit and a switch comprised in the adjustable power supply circuit.

Thus, one advantage of the power interface is that it is arranged to operate a load, such as a light source, from an adjustable power supply circuit, such as a standard wall dimmer, below the adjustable power supply circuit's original minimum load requirements. A further advantage is that the power interface is arranged to operate a load from an adjustable power supply circuit even below the adjustable power supply circuit's minimum holding current.

The current shaper may be configured to form a periodically pulsed current, thereby ensuring that the current at least periodically is greater than the holding current level.

The pulsed current may comprise pulses of no current and pulses of a current higher than the required holding current level of the adjustable power supply circuit, where the pulse of the high current is used to keep the adjustable power supply circuit on, while the pause (i.e. the period of no current) is used to lower the average current.

The period of the current shaper is preferably such that any fluctuations in current are not perceivable in the light emitted by a light source driven by the current. For example, it may be 5-50 μs, preferably 15-30 μs.

The current shaper may be activated during a time duration of the period that is long enough to ensure that the adjustable power supply is in a conducting state. The time duration of the activation typically depends on the period of the current shaper, as a longer period of low current will require a longer period of higher current to keep the adjustable power supply in a conducting state. With proper control of the period and the activation time, improved operation can be achieved. Alternatively, more than two time intervals and more than two current levels can be defined and applied, so as to have a special waveform to improve operation with certain adjustable power supply circuits.

The current shaper may be a boost converter, which is a practical way to realize an embodiment of the invention. Combining the boost converter with the minimum load voltage, being higher than the peak value of the mains voltage, guarantees that at most points in time, the current drawn trough the adjustable power supply circuit can be set by the current shaper.

The boost converter may be configured for a fixed peak current, in order to facilitate circuit design. In other words, this can reduce the complexity of the control loop of the current shaper.

According to an embodiment, the adjustable power supply circuit is comprised in a dimmer, and the load is a dimmable light source. In this case, circuit components may be determined according to a pre-determined maximum amount of flicker in the light outputted by the light source.

The power interface may further comprise a capacitor arranged in parallel between the current shaper and the load, to avoid large fluctuations in the current through the load (i.e. to stabilize the power delivered to the load). During periods of high current, the capacitor is charged. During periods of low or no current, the capacitor provides energy to the load.

If the load is a light source, the capacitance of the capacitor may be determined according to a pre-determined maximum amount of flicker in the light outputted by the light source.

One advantage may be that the power interface may enable TRIAC-dimmed LED light sources at low wattages.

It is noted that the invention relates to all possible combinations of features recited in the claims.

BRIEF DESCRIPTION OF THE DRAWINGS

These and other aspects of the present invention will now be described in more detail, with reference to the appended drawings showing one or more embodiments of the invention.

DETAILED DESCRIPTION

The embodiments below are provided by way of example, so that this disclosure will be thorough and complete, and fully conveys the scope of the invention to those skilled in the art. Like numbers refer to like elements throughout. The examples relate to a general power interface for connecting a load to an adjustable power supply circuit having a time-dependent holding current level. In the examples below the adjustable power supply circuit is sometimes embodied as a TRIAC which may be part of a dimmer. However, the adjustable power supply circuit may be any adjustable power supply circuit fulfilling any requirements set forth below. In the examples below the load is sometimes embodied as a (LED-based) light source. However, the load may be any suitable load fulfilling any requirements set forth below.

Figure 1:
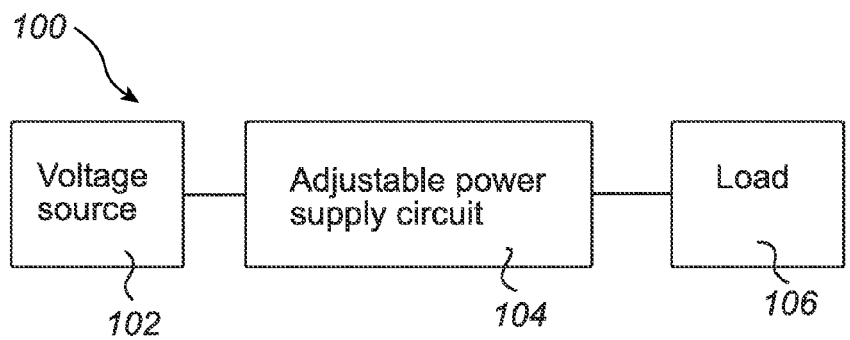
FIG. 1 is a schematic illustration of a prior art circuit.

FIG. 1 illustrates a prior art circuit 100 comprising a voltage source 102, an adjustable power supply circuit 104 and a load 106. The adjustable power supply circuit may have a time-dependent holding current level. There may be a problem with operating the circuit if, for example, the load is too small to work properly with the adjustable power supply circuit. This could, for example, be the case if the adjustable power supply circuit is a wall dimmer and the load is a light source, particularly if the light source comprises one or more light emitting diodes (LEDs). As a result the light source may start to flicker or even permanently switch off when the dimming level determined by the dimmer becomes too low.

Figure 2A:
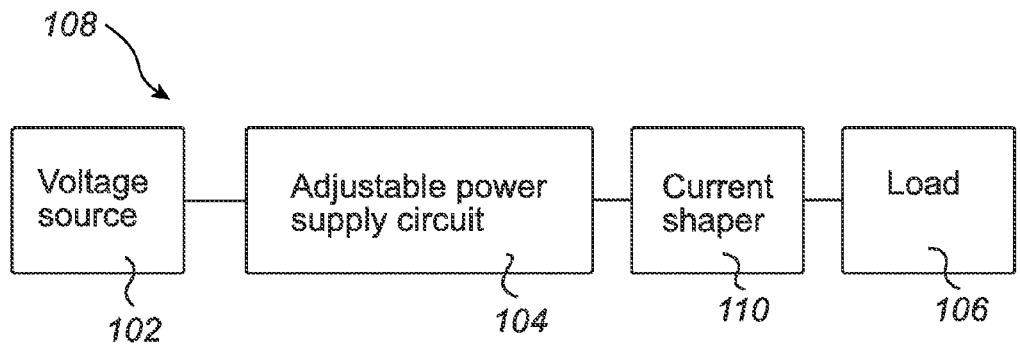
FIGS. 2a-2e are schematic illustrations of power interface circuits according to embodiments.

According to an embodiment of the present invention, a current shaper 110 is arranged to be operatively connected between the load 106 and the adjustable power supply circuit 104 as shown in a power interface circuit 108 of FIG. 2a. The power interface is thus provided for connecting the load to the adjustable power supply circuit. As will be further disclosed below, the power interface is arranged such that the above mentioned problems are avoided, or at least reduced. Particularly the current shaper is configured to interrupt and re-establish a current flow from the adjustable power supply circuit to the load. The current shaper thus ensures that the current through the adjustable power supply circuit at least periodically is above the holding current level of the adjustable power supply circuit. Thereby the current shaper keeps the adjustable power supply circuit in a conducting state even if the average current consumption of the load is lower than the holding current level. The current shaper may be configured to supply the load with a minimum forward voltage being higher than a peak value of a mains voltage provided to the adjustable power supply circuit by the voltage source. The holding current level may be determined by a circuit topology (including the electronic components and the values thereof) of the adjustable power supply circuit and a switch comprised in the adjustable power supply circuit.

Figure 2B:
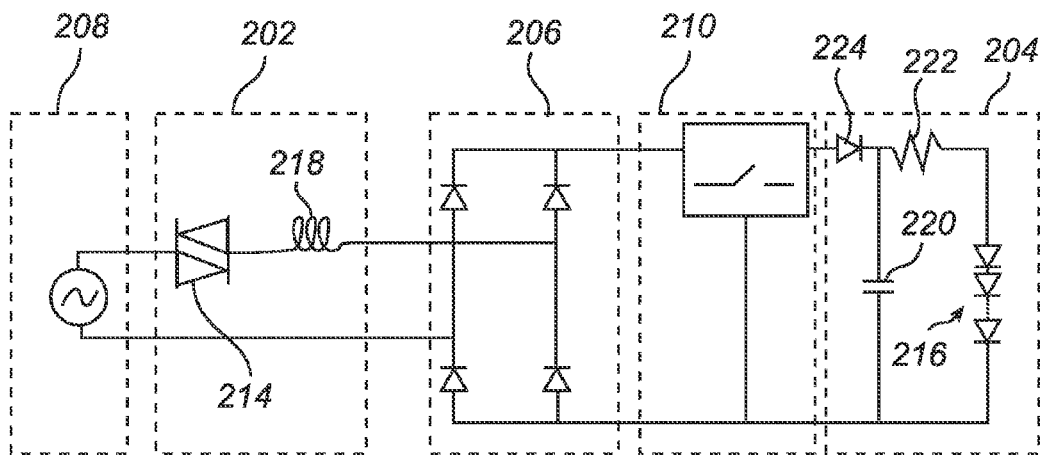

FIG. 2b is a second example of a power interface circuit comprising an adjustable power supply circuit 202, a load 204, a rectification circuit 206, a power supply 208 and a current shaper 210 according to an embodiment of the present invention. For illustrative purposes the adjustable power supply circuit 202 is in FIG. 2b embodied as a TRIAC 214 circuit. The TRIAC may be comprised in a typical dimmer. Further, the load 204 is represented by a typical LED-based light source 216. However, it may also be possible to use the disclosed power interface with non-SSL light sources, e.g. for dimmable low wattage CFL-lamps. In FIG. 2b a set of diodes form the rectification circuit 206. The presence of a rectification circuit 206 as such and/or the components comprised in the rectification circuit 206 generally depends on the realization of the current shaper 210.

The power interface circuit will be described in an operating state. When it is activated, a current higher than the holding current requirement of the TRIAC 214 is built up. During a deactivation period, firstly the energy stored in an inductor 218 (further inductors may be comprised in the current shaper 210, see below) freewheels into the capacitor 220, which generally has a voltage higher than the peak value of the mains voltage (as supplied by the voltage source 208), and secondly there is a pause in the mains supply current. The capacitance of the capacitor 220 may be determined according to a pre-determined maximum amount of flicker in the light outputted by the light source. Due to the short duration of the pause, the TRIAC 214 will stay on and further current flow is possible during the next activation interval. The purpose of resistor 222 is to reduce the voltage over the LEDs. The diode 224 is a free-wheeling diode used to allow continuation of current flow from an inductive load after deactivation of the switch in the current shaper, thereby eliminating sudden voltage spikes occurring at inductive loads when the supply voltage is suddenly reduced or removed.

The current shaper 210 may have a certain minimum operating voltage, i.e. it may not be possible to draw the full required peak current at very low input voltages around the zero crossing. As a result, at the end of the (either positive or negative) mains half cycle the current may fall below the value required to keep the TRIAC 214 on. However, this is the indented mode of operation. During the next half cycle, the circuit power interface 210 will start consuming power from the mains voltage source as soon as the TRIAC 214 is activated again.

Using a current shaper having a fixed peak current (but without output voltage regulation) may result in an output voltage which varies according to the firing angle of the adjustable power supply circuit. The minimum forward voltage of the load, such as the minimum forward voltage of the LED-based light source, has to be selected to be higher than the peak value of the mains voltage. But, when using a different power interface circuit topology which incorporates some voltage translation ratio, a lower forward voltage of the load, such as lower LED burning voltages, may also be possible.

The load is powered all the time from the energy stored in the capacitor 220. The size of this capacitor has to be selected according to the allowed level of flicker in the light output of the lamp. The allowed level of flicker may be pre-determined.

Figure 2C:
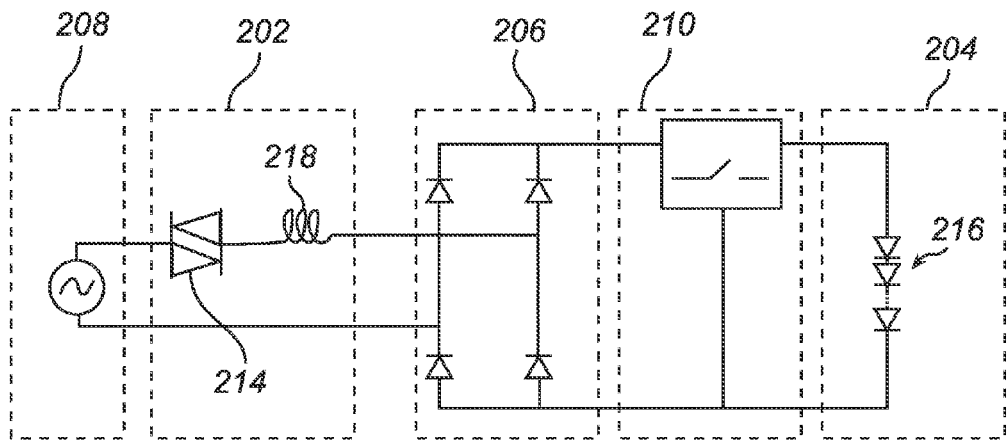

FIG. 2c is a third example of a power interface circuit according to an embodiment of the present invention. As in FIG. 2b the circuit of FIG. 2c comprises an adjustable power supply circuit 202, a load 204, a rectification circuit 206, a power supply 208 and a current shaper 210 arranged to generate a pulsed current. The functions of these elements are generally the same as the functions of the corresponding elements in FIG. 2b; the adjustable power supply circuit 202 is embodied as a TRIAC circuit 214, the load 204 is embodied as a LED-based light source 216, and the rectification circuit 206 is embodied as a number of diodes. In comparison to the circuit of FIG. 2b the circuit of FIG. 2c comprises a reduced number of rectification and freewheeling diodes. The requirement of a rectification circuit and/or the number of freewheeling diodes may in general depend on the current shaper. For the embodiment in FIG. 2c the current shaper requires a rectification circuit.

Figure 2D:
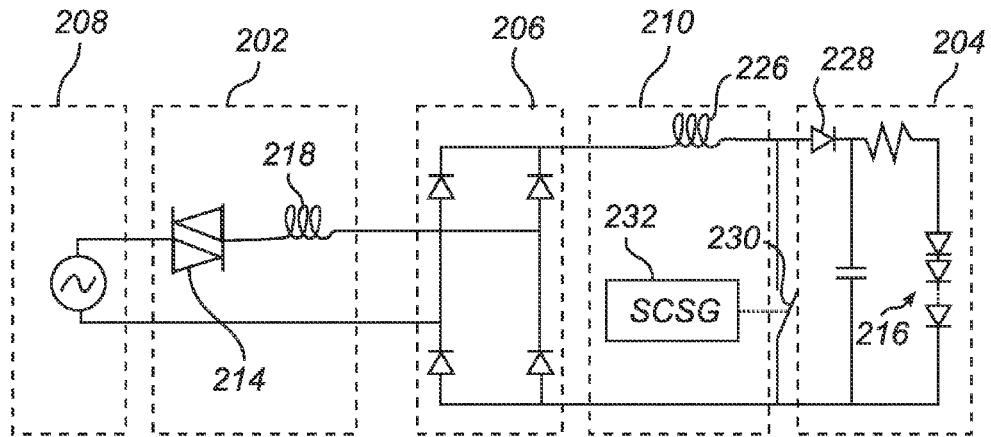
Figure 2E:
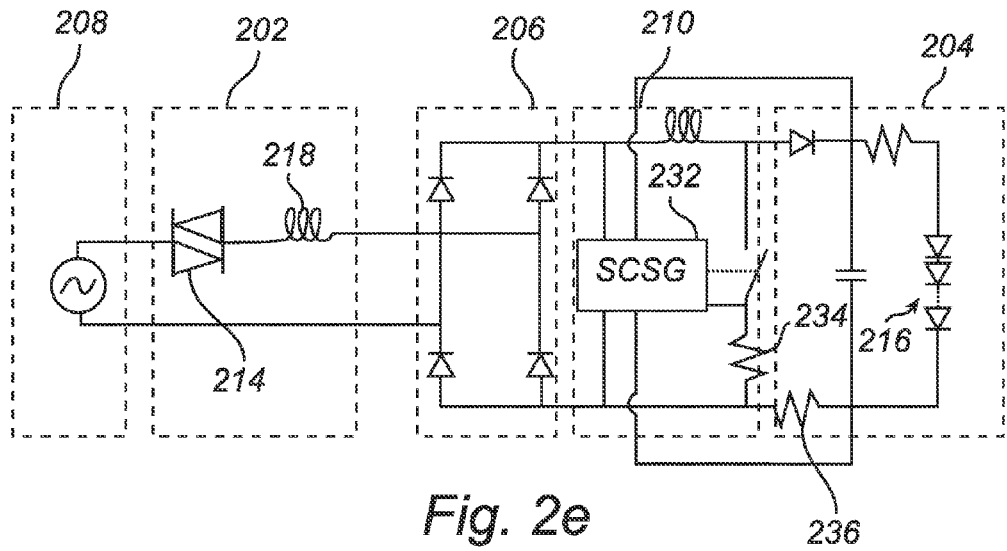

FIGS. 2d-2e show further examples of a power interface circuit according to an embodiment of the present invention. The power interface circuits of FIGS. 2d-2e each comprise an adjustable power supply circuit 202, a load 204, a rectification circuit 206, a power supply 208 and a current shaper arranged to generate a pulsed current. The functions of these elements are generally the same as the functions of the corresponding elements in FIG. 2b; the adjustable power supply circuit 202 is embodied as a TRIAC circuit 214, the load 204 is embodied as a LED-based light source 216, and the rectification circuit 206 is embodied as a number of diodes. In the circuit of FIG. 2d the current shaper is formed by an inductor 226, a diode 228 and a switch 230 controlled by a switch control signal generator 232. The switch control signal generator 232 is arranged to control a switch of the current shaper. The switch 230 is thus utilized when the pulsed current is being generated. In comparison to the power interface circuit of FIG. 2d the power interface circuit of FIG. 2e comprises two additional current sensing resistors 234, 236. In FIG. 2e the switch control signal generator 232 is arranged to receive feedback signals from the load and the adjustable power supply circuit, respectively, thereby providing an adaptive switch control signal generator. Examples of switch control signal generators and their internal components will be further disclosed below with references to FIGS. 4a-4b.

Figure 3A:
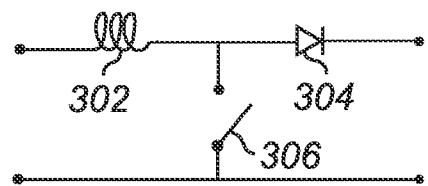
FIGS. 3a-3e are schematic illustrations of current shapers according to embodiments.
Figure 6:
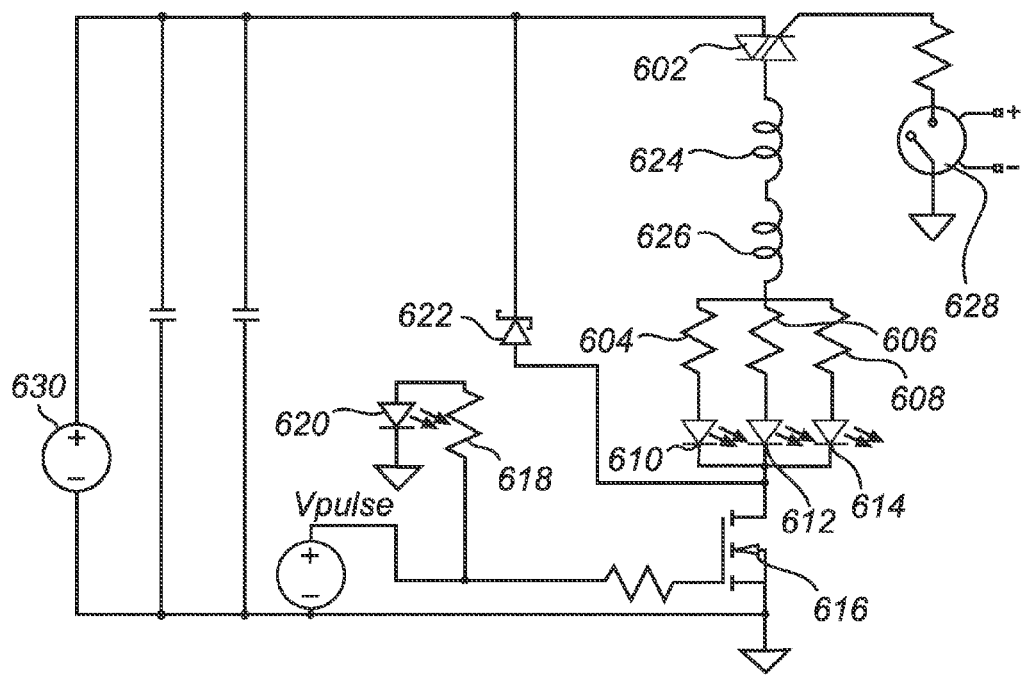
FIG. 6 is a schematic illustration of a test circuit according to embodiments.

In general the current shaper comprises a circuit capable of switching between two different impedances. FIG. 3a is a schematic illustration of a first current shaper according to an embodiment of the present invention. The current shaper may be formed by an electric circuit providing a pulsed current. The current shaper of FIG. 3a comprises an inductor 302, a diode 304 and a switch 306. When being charged the current shaper acts as a load and absorbs energy; when being discharged, it acts as an energy source. The voltage produced by the current shaper during the discharge phase is related to the rate of change of current, not to the original charging voltage, thus allowing different input and output voltages. The current shaper may be a boost converter (also known as step-up converter) which is activated and deactivated according to a required pulse repetition rate. For a boost converter a rectifier circuit may be required, but other current shapers may not require such a rectifier. The current converter may be configured for a fixed peak current by choosing its components (and the control thereof) accordingly. With reference to FIG. 6, a description is given of a test circuit which may be used to choose values of the components of the current shaper.

Figure 3B:
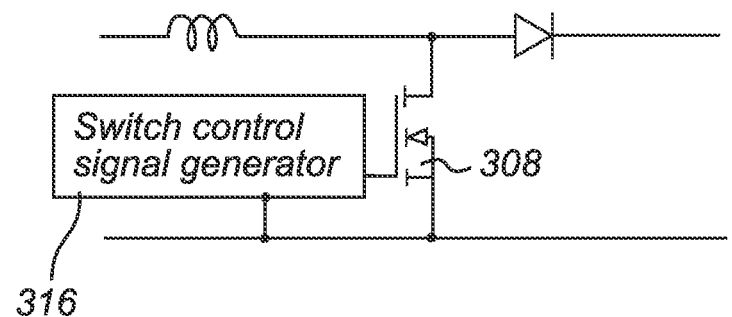
Figure 3C:
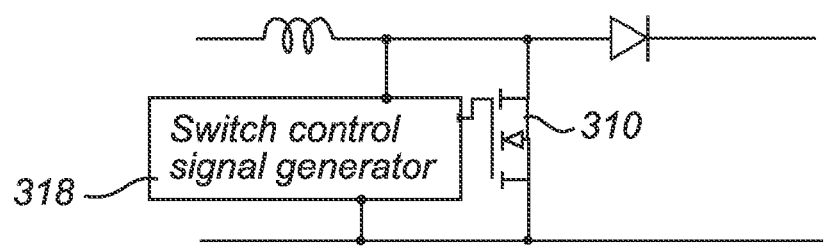
Figure 3D:
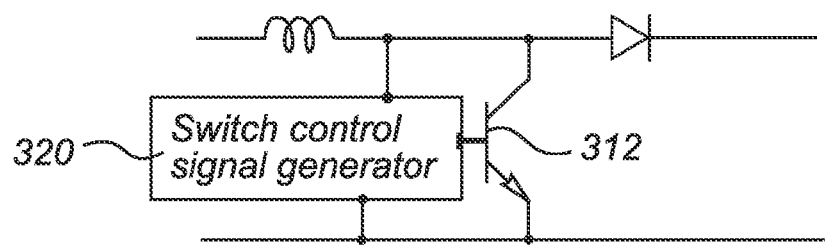
Figure 3E:
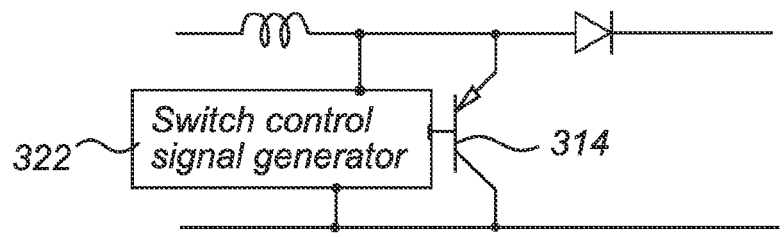

As stated above there may be other variations of current shapers. FIGS. 3b-3e show further examples of current shapers according to embodiments of the present invention. The current shapers of FIGS. 3b-3e have in common that the circuit design is based on a transistor acting as the switch. In more detail, the switches of the current shapers of FIGS. 3b-3e are embodied as either metal oxide semiconductor field-effect transistors (MOSFET) 308, 310 or bipolar junction transistors (BJT) 312, 314 controlled by switch control signal generators 316, 318, 320, 322. Switch control signal generators will be further disclosed below with reference to FIGS. 4a-4b. The switch of the current shaper of FIG. 3b is embodied as a MOSFET 308 connecting its drain between the inductor and the anode side of the diode of the current shaper. The source of the MOSFET 308 is connected to ground. Alternatively, as shown in the current shaper of FIG. 3c, the switch may be embodied as a MOSFET 310 connecting its source between the inductor and the diode of the current shaper. For this embodiment the drain of the MOSFET310 is connected to ground. The switch of the current shaper of FIG. 3d is embodied as a NPN BJT 312 connecting its collector between the inductor and the diode of the current shaper. The emitter of the NPN BJT 312 is connected to ground. According to a further alternative as shown in FIG. 3e, the switch of the current shaper may be embodied as a PNP BJT 314 connecting its collector between the inductor and the diode of the current shaper. For this embodiment the emitter of the PNP BJT314 is connected to ground.

Alternatively, without changing the effective functionality of the circuit, the positive potential may be directly connected to the load, wherein the inductor and the diode are placed in the negative path.

Figure 4A:
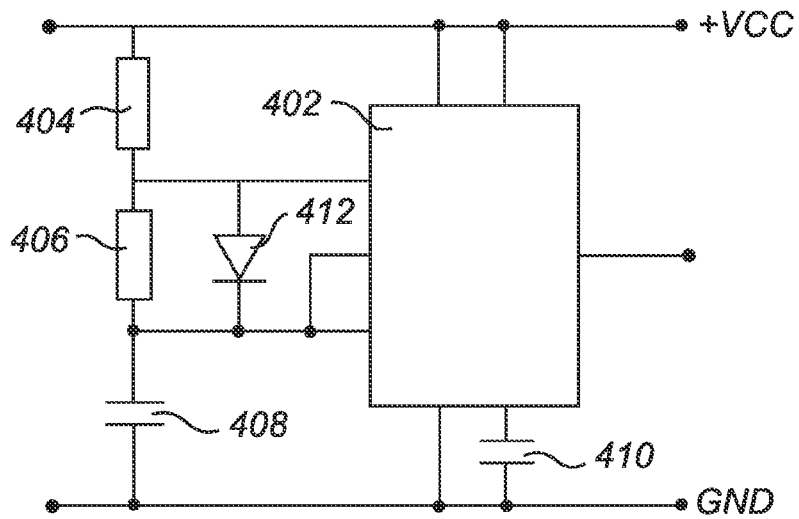
FIGS. 4a-4b are schematic illustrations of switch control signal generators according to embodiments.
Figure 4B:
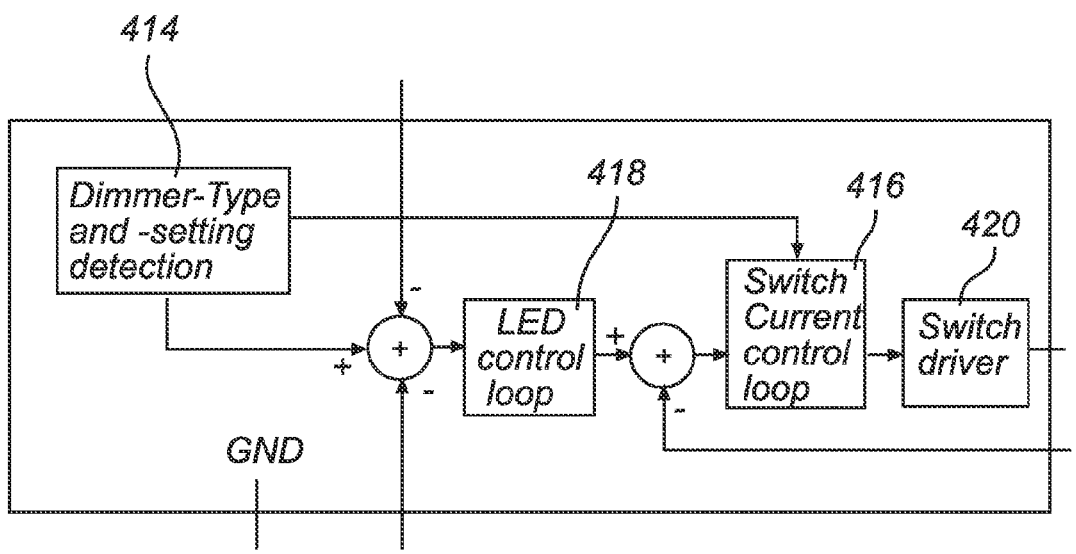

As mentioned above the current shaper may comprise a switch control signal generator. FIGS. 4a-4b are schematic illustrations of switch control signal generators according to embodiments. A first example of a switch control signal generator is shown in FIG. 4a. In the switch control signal generator of FIG. 4a the functionality is based on a standard timer integrated circuit 402, well know in the literature and to the person skilled in the art. The duration of the high and low periods of the output signal is determined by the components connected to the timer circuit 402, namely resistors 404, 406, capacitors 408, 410 and diode 412.

In contrast to the switch control signal generator of FIG. 4a, where the timing is fixed by the components used, it is also possible to generate the timing signal in dependence on actual measured or captured data. In FIG. 4b, a possible control loop to generate the switch signal is shown. Via a first input the rectified input voltage is measured. Based on this, the type of adjustable power supply circuit and the current setting of the adjustable power supply circuit is detected (by the so-called dimmer type and setting detection 414). The generation of timing signals in the switch current control loop 416 is influenced by this detection. In addition a so-called dim value is derived. Based on this dim value (being the set point command), a measured LED current (being the actual value) and a measured capacitor voltage (being a feed forward disturbance compensation), the desired switch current and hence the LED current is calculated in a LED control loop 418. The result of the block 418 (as set point command) is compared with the actual switch current (being the actual value) to calculate the timing signals, influenced by the result from the so-called dimmer type and setting detection 414. Finally, a switch driver 420 is used to amplify the timing signal towards a suitable gate or base drive signal.

Figure 5:
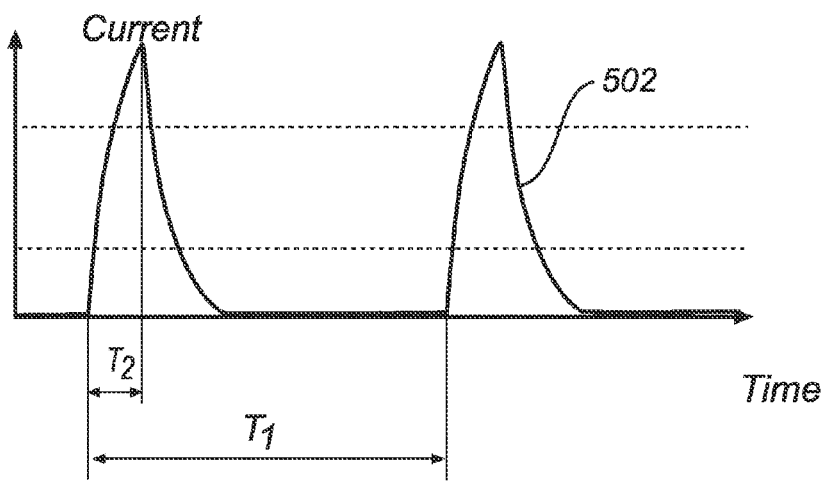
FIG. 5 illustrates current as a function of time.

FIG. 5 illustrates the pulsed current 502 generated by the current shaper as a function of time. In general, the Figure shows that the pulsed current is made up of time intervals of high current and time intervals of no current. The period of the current comprising one time interval of high current and one time interval of no current is denoted T1. The behavior of the pulsed current depends inter alia on the circuitry of the current shaper. More particularly, the components of the current shaper and the control signals thereof are chosen such that the period T1 of the current shaper in general is 5-50 µs, preferably 15-30 µs. The activation time of the current shaper is denoted T2. A longer T1 may imply a longer T2. In general, if the adjustable power supply circuit comprises a capacitance, then T1 (and thus also T2) will depend on this capacitance. Thus, the period T1 may be defined by inter alia a capacitance in the adjustable power supply circuit. Further, the peak value of the pulsed current should be higher than the required holding current level of the TRIAC.

FIG. 6 is a schematic illustration of a test circuit according to embodiments. Thus, the test circuit may be utilized in the design process of the current shaper. Hence the test circuit may be regarded as a TRIAC evaluation circuit. In other words the test circuit may be used to find the parameters of the current shaper for a given TRIAC 602 and a given load. In the example of FIG. 6 the load is represented by resistors 604, 606, 608 and LEDs 610, 612, 614 connected to the resistors 604, 606, 608. That is, the resistors 604, 606, 608 are used to set the current level, in combination with the supply voltage level provided by the source 630. In FIG. 6 the current shaper is formed by the MOSFET 616 and the resistor R1. One purpose of R1 is to limit the switching speed of the MOSFET 616. The external pulse generator Vpulse is utilized to control the period of the MOSFET 616. The MOSFET 616 is used to modulate the current, depending on the pulse train supplied by Vpulse (i.e., the MOSFET 616 enables a pulsed current to be generated). A resistor 618 may be utilized in order to reduce the voltage over the MOSFET 616. The LED 620 next to the resistor 618 provides a visual reference of the pulse. A diode 622 is a freewheeling diode. Further, inductors 624 and 626 represent inductors used in a typical wall dimmer circuit and the parasitic inductance in the installation, respectively, where this kind of inductance is typically present. Freewheeling diodes may be used in order to allow for demagnetisation of the inductors. In the intended power interface circuits according to FIGS. 2a-2e, this demagnetization is performed by the current shaper presenting a forward voltage higher than the mains voltage.

During a test evaluation, the circuit of FIG. 6 can be activated by manually pressing a button 628 to supply a trigger current, while supplying a static on-signal (duty-cycle=100%) to the MOSFET 616. Then, the duty cycle of the MOSFET drive signal can be reduced until the TRIAC 602 switches off. At a slightly higher duty cycle, it is possible to start the circuit again and keep it in the conductive state for any desired period of time. Thus, by tuning the values of the components of the current shaper a suitable duty cycle (i.e. wherein the TRIAC is kept in a conductive state for any desired period of time) may be found.

As an example, a TRIAC with a static DC holding current of 13.2 mA was used. For the present example the current flow thought the load was activated every~23 µs for a time period of ~3 µs. Due to the inductance, this current slowly ramped up and down. The average value of the current consumption was then measured to be only~8 mA. This current is to be compared to the DC holding current of the TRIAC which, as stated above, is 13.2 mA. Thus, as a result, the minimum average current to keep the TRIAC on in pulsed mode is significantly smaller than in DC mode. In a 230V system, the 8 mA would correspond to a load with a maximum power consumption of 1.2 W (if not adjusted by the adjustable power supply circuit).

The combination of repetition rate, activation period and peak current (in this example: 23 µs, 3 µs and 55 mA, respectively) may thus be tuned to the requirements of the circuitry. A higher repetition rate, longer activation periods and higher current may be possible, whereas e.g. a slower repetition rate may be possible at a higher peak current.

The person skilled in the art realizes that the present invention by no means is limited to the preferred embodiments described above. On the contrary, many modifications and variations are possible within the scope of the appended claims.

The invention claimed is:

1. A power interface for connecting a load to an adjustable power supply circuit having a time dependent holding current level, comprising:
 a current shaper arranged to be operatively connected between the load and the adjustable power supply circuit; wherein
 the current shaper is configured to interrupt and re-establish a current flow from the adjustable power supply circuit, thereby ensuring that the current through the adjustable power supply circuit periodically is above the holding current level, and thereby keeping the adjustable power supply circuit in a conducting state even when the average current consumption of the load is lower than the holding current level;
 wherein the current shaper is configured to form a periodical pulsed current.

2. The power interface according to claim 1, wherein the pulsed current comprises pulses of no current and pulses of a current being higher than the required holding current level of the adjustable power supply circuit.

3. The power interface according to claim 1, wherein a period T1 of the current shaper is 5-50 µs.

4. The power interface according to claim 3, wherein the period T1 is defined by a capacitance in the adjustable power supply circuit.

5. The power interface according to claim 1, wherein the current shaper is configured to supply the load with a minimum forward voltage being higher than a peak value of a mains voltage provided to the adjustable power supply circuit.

6. The power interface according to claim 1, wherein the current shaper is a boost converter.

7. The power interface according to claim 6, wherein the boost converter is configured for a fixed peak current.

8. The power interface according to claim 1, wherein the adjustable power supply circuit is comprised in a dimmer.

9. The power interface according to claim 1, wherein the holding current level is determined by a circuit topology of the adjustable power supply circuit and a switch comprised in the adjustable power supply circuit.

10. The power interface according to claim 1, further comprising a capacitor arranged in parallel between the current shaper and the load.

11. The power interface according to claim 10, wherein the load comprises a light source.

12. The power interface according to claim 10, wherein the capacitance of the capacitor is determined according to a pre-determined maximum amount of flicker in the light outputted by the light source.

13. A power interface circuit, comprising:
a voltage source;
an adjustable power supply circuit having a holding current level, the holding current level being a minimum current which must pass through the adjustable power supply circuit so that the adjustable power supply circuit remains in a conducting state;
a current shaper operatively connected between a load and the adjustable power supply circuit to supply a pulsed current;
the load including a plurality of LEDs;
the current shaper configured to interrupt and re-establish a supply current from the adjustable power supply circuit to the load, wherein the supply current through the adjustable power supply circuit periodically is above the holding current level, thereby keeping the adjustable power supply circuit in a conducting state when the average current consumption of the load is lower than the holding current level;
the current shaper including a switch and a switch control signal generator and including a boost converter and a rectifier circuit, the switch control signal generator operative to control the switch.

14. The power interface circuit of claim 13 further comprising current sensing resistors in electrical connectivity with the switch control signal generator and the load allowing the switch. control signal generator to receive a feedback signal from the load and also from the adjustable power supply circuit.

15. A power interface circuit, comprising:
a voltage source;
an adjustable power supply circuit having a holding current level, the holding current level. being a minimum current which must pass through the adjustable power supply circuit so that the adjustable power supply circuit remains in a conducting state;
a current shaper operatively connected between a load and the adjustable power supply circuit to supply a pulsed current;
the load including a plurality of LEDs;
the current shaper configured to interrupt and re-establish a supply current from the adjustable power supply circuit to the load;
wherein the supply current through the adjustable power supply circuit periodically is above the holding current level keeping the adjustable power supply circuit in a conducting state when the average current consumption of the load is lower than the holding current level;
the current shaper including a switch and a switch control signal generator;
the switch including a transistor and configured to allow the current shaper to supply a fixed peak current to the load.

16. A power interface circuit, comprising:
a low power light source electrically connected to a dimmer containing a TRIAC having a time-dependent holding current level:
a current shaper operatively connected between the low power light source and the dimmer;
the current shaper configured to interrupt and re-establish a current flow form the dimmer during a TRIAC conduction period of the dimmer so that the current flow includes periodic pulses of no current and periodic pulses of a current being higher than the required holding current of the dimmer thereby keeping the dimmer in a conducting state even when the average current consumption of the low power light source is lower than the holding current.

17. The power interface circuit of claim 16 wherein the period T1 of the current s haper is b 5-50 μS.

18. The power interface circuit of claim 17 wherein the period T1 is defined by a capacitance of the dimmer connected to the power interface circuit.

19. The power interface circuit of claim 16 further including a capacitor arranged in parallel between the current shaper and the low power light source wherein the capacitance of the capacitor is determined according to a pre-determined maximum amount of flicker in the light output of the low power light source.

* * * * *